(12) United States Patent
Baeumges et al.

(10) Patent No.: US 10,146,834 B2
(45) Date of Patent: *Dec. 4, 2018

(54) SPLIT PROCESSING PATHS FOR A DATABASE CALCULATION ENGINE

(71) Applicants: Daniel Baeumges, Viersen (DE); Christian Bensberg, Heidelberg (DE); Lars Fricke, Karlsruhe (DE)

(72) Inventors: Daniel Baeumges, Viersen (DE); Christian Bensberg, Heidelberg (DE); Lars Fricke, Karlsruhe (DE)

(73) Assignee: SAP SE, Walldorf (DE)

( * ) Notice: Subject to any disclaimer, the term of this patent is extended or adjusted under 35 U.S.C. 154(b) by 456 days.

This patent is subject to a terminal disclaimer.

(21) Appl. No.: 14/518,593

(22) Filed: Oct. 20, 2014

(65) Prior Publication Data
US 2015/0039588 A1 Feb. 5, 2015

Related U.S. Application Data

(63) Continuation of application No. 13/336,935, filed on Dec. 23, 2011, now Pat. No. 8,868,594.

(51) Int. Cl.
*G06F 17/30* (2006.01)

(52) U.S. Cl.
CPC .. *G06F 17/30486* (2013.01); *G06F 17/30424* (2013.01); *G06F 17/30445* (2013.01); *G06F 17/30451* (2013.01); *G06F 17/30463* (2013.01); *G06F 17/30477* (2013.01); *G06F 17/30522* (2013.01)

(58) Field of Classification Search
CPC ......... G06F 17/30463; G06F 17/30445; G06F 17/30457; G06F 17/30383; G06F 17/30498; G06F 17/30442; G06F 17/30483; G06F 17/30938
USPC ......... 707/713, 736–737, 769–770
See application file for complete search history.

(56) References Cited

U.S. PATENT DOCUMENTS

| | | |
|---|---|---|
| 6,625,593 B1 | 9/2003 | Leung et al. |
| 6,775,673 B2 | 8/2004 | Mahalingam et al. |
| 7,299,226 B2 | 11/2007 | Bruno et al. |
| 7,603,339 B2 | 10/2009 | Cruanes et al. |

(Continued)

OTHER PUBLICATIONS

Herodotou, et al., Query optimization techniques for partitioned tables, Proceedings of the 2011 International Conference on Management of Data, Jun. 12, 2011, pp. 49-60.

(Continued)

*Primary Examiner* — Michelle N Owyang
(74) *Attorney, Agent, or Firm* — Mintz Levin Cohn Ferris Glovsky and Popeo, P.C.

(57) ABSTRACT

A dynamic split node defined within a calculation model can receive data being operated on by a calculation plan generated based on the calculation model. A partition specification can be applied to one or more reference columns in a table containing at least some of the received data. The applying can cause the table to be split such that a plurality of records in the table are partitioned according to the partition specification. A separate processing path can be set for each partition, and execution of the calculation plan can continue using the separate processing paths, each of which can be assigned to a processing node of a plurality of available processing nodes.

9 Claims, 6 Drawing Sheets

(56) References Cited

U.S. PATENT DOCUMENTS

| | | | |
|---|---|---|---|
| 7,734,615 B2* | 6/2010 | Anderson | G06F 17/30312 707/713 |
| 7,930,294 B2 | 4/2011 | Shuf et al. | |
| 8,868,594 B2 | 10/2014 | Baeumges et al. | |
| 2005/0187977 A1* | 8/2005 | Frost | G06F 17/30584 |
| 2006/0080285 A1 | 4/2006 | Chowdhuri | |
| 2008/0071754 A1 | 3/2008 | Muras | |
| 2008/0147627 A1* | 6/2008 | Natkovich | G06F 17/3046 |
| 2009/0254916 A1 | 10/2009 | Bose et al. | |
| 2010/0191720 A1 | 7/2010 | Al-Omari et al. | |
| 2011/0302151 A1* | 12/2011 | Abadi | G06F 17/30445 707/714 |

OTHER PUBLICATIONS

Khoshafian et al., "A Query Processing Strategy for the Decomposed Storage Model", Proceedings of the International Conference on Data Engineering, IEEE Comp. Soc. Press, vol. CONF. 3, Feb. 1, 1987, pp. 636-643.

Loshin, "Gaining the Performance Edge Using a Coumn-Oriented Database Management System", Sybase, Jan. 1, 2009, Retrieved from the Internet: <URL:http://www.sybase.com/files/White.sub.--Papers/Performance-Column- -DBM-041509-WP.pdf>.

Tsuchida et al., "Implementing Vertical Splitting for Large Scale Multidimensional Datasets and its Evaluations", Data Warehousing and Knowledge Discovery, Aug. 29, 2011, pp. 208-223.

* cited by examiner

SPLIT PROCESSING PATHS FOR A DATABASE CALCULATION ENGINE

CROSS REFERENCE TO RELATED APPLICATIONS

This application is a continuation application of U.S. patent application Ser. No. 13/336,935, filed on Dec. 23, 2011, titled "Split Processing Paths for a Database Calculation Engine" the disclosure of which is hereby incorporated by reference in its entirety.

TECHNICAL FIELD

The subject matter described herein relates to calculation models for performing operations on two or more tables using split processing paths.

BACKGROUND

In recent years, central processing units (CPUs) of computer processing hardware have generally experienced their greatest performance increases by increasing the number of processor cores rather than through increasing clock rates. Accordingly, to maximize performance, modern software advantageously employs the benefits of multi-core CPUs by allowing parallel execution and with architectures that scale well with the number of cores. For data management systems, taking full advantage of parallel processing capabilities generally requires partitioning of stored data into sections or "partitions" for which the calculations can be executed in parallel.

A database program or database management system generally displays data as two-dimensional tables, of columns and rows. However, data are typically stored as one-dimensional strings. A row-based store typically serializes the values in a row together, then the values in the next row, and so on, while a column-based store serializes the values of a column together, then the values of the next column, and so on.

In general, column-based systems are more efficient when an aggregate needs to be computed over many rows but only for a notably smaller subset of all columns of data, because reading that smaller subset of data can be faster than reading all data. Column-based systems can be more efficient when new values of a column are supplied for all rows at once, because that column data can be written efficiently and replace old column data without touching any other columns for the rows. Row-based systems can be more efficient when many columns of a single row are required at the same time, and when row-size is relatively small, as the entire row can be retrieved with a single disk seek. Row-based systems can also be more efficient when writing a new row if all of the column data is supplied at the same time, as the entire row can be written with a single disk seek.

Column-based storage can facilitate execution of operations in parallel using multiple processor cores. In a column store, data are already vertically partitioned, so operations on different columns can readily be processed in parallel. If multiple columns need to be searched or aggregated, each of these operations can be assigned to a different processor core. In addition, operations on one column can be parallelized by partitioning the column into multiple sections that are processed by different processor cores. Column data is typically of uniform type, which can facilitate opportunities for storage size optimizations available in column-based data stores that are not available in row-based data stores.

For example, some modern compression schemes can make use of the similarity of adjacent data to compress. To improve compression of column-based data, typical approaches involve sorting the rows. For example, using bitmap indexes, sorting can often improve compression by approximately an order of magnitude. In conventional systems, columnar compression generally achieves a reduction in storage space requirements at the expense of efficiency of retrieval. Retrieving all data from a single row can be more efficient when that data is located in a single location, such as in a row-based architecture. Further, the greater adjacent compression achieved, the more difficult random-access may become, as data typically need to be uncompressed to be read. Therefore, conventional column-based architectures are often enriched by additional mechanisms aimed at minimizing the need for access to compressed data. These additional mechanisms can result in lower compression efficiency and/or increased processing requirements to access the compressed data.

Currently available relational database management systems can accomplish partitioning based on specified criteria applied to split the database. In general, a partitioning key is used to assign a partition based on certain criteria. Commonly used approaches include range partitioning, list partitioning, hash partitioning, round robin partitioning, and composite partitioning. In range partitioning, a partition can be defined by determining if the partitioning key is inside a certain range. For example, a partition can be created to include for all rows in which values in a column of postal codes are between 70000 and 79999. In list partitioning, a partition can be assigned a list of values and the partition can be chosen if the partitioning key has one of the values on the list. For example, a partition built to include data relating to Nordic countries can includes all rows in which a column of country names includes the text string values Iceland, Norway, Sweden, Finland, Denmark, etc. In hash partitioning, the value of a hash function can determine membership in a partition. For example, for a partitioning scheme in which there are four partitions, the hash function can return a value from 0 to 3 to designate one of the four partitions. Round robin partitioning can be used to distribute storage and/or processing loads among multiple data partitions and/or servers or server processes according to a pre-set rotation among the available partitions or servers or server processes. As an example, a first data unit can be directed to a first partition of three partitions, a second data unit to the second partition, a third data unit to the third partition, a fourth data unit to the first partition, and so forth. In composite partitioning, certain combinations of other partitioning schemes can be allowed, for example by first applying a range partitioning and then a hash partitioning.

SUMMARY

In one aspect, a method includes receiving data being operated on by a calculation plan generated based on a calculation model at a dynamic split node defined within the calculation model. A partition specification is applied to one or more reference columns in a table containing at least some of the received data. The applying causes the table to be split such that a plurality of records in the table are partitioned according to the partition specification. A separate processing path is set for each partition, and execution of the calculation plan continues from the split node using the separate processing paths such that each of the separate processing paths is assigned to a processing node of a plurality of available processing nodes.

In some variations of the current subject matter, one or more of the following features can optionally be included in any feasible combination. The partition specification can optionally include a split of the table according to a number of distinct values in the one or more reference columns. The calculation plan can optionally be generated in response to a query. The method can optionally further include initiated the query, which can optionally include receiving a first data request by a recipient node of the plurality of processing nodes, each of which includes at least one data partition of the plurality of data partitions. The first data request can optionally be received directly from a requesting machine without being handled by a master node. The recipient node can optionally identify a target node of the plurality of processing nodes to handle the data request. The determining can optionally include the recipient node applying partitioning information to determine one partition of the plurality of partitions to which the data request should be directed and mapping information associating each data partition of the plurality of data partitions with an assigned node of the plurality of processing nodes. The recipient node can optionally redirect the data request to the target node so that the target node can act on the one partition in response to the data request. The partitioning information and the mapping information can optionally be accessed from at least one of a local storage accessible to the recipient node and a metadata repository accessible to each of the plurality of processing nodes.

Implementations of the current subject matter can include, but are not limited to, systems and methods consistent including one or more features are described as well as articles that comprise a tangibly embodied machine-readable medium operable to cause one or more machines (e.g., computers, etc.) to result in operations described herein. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1:
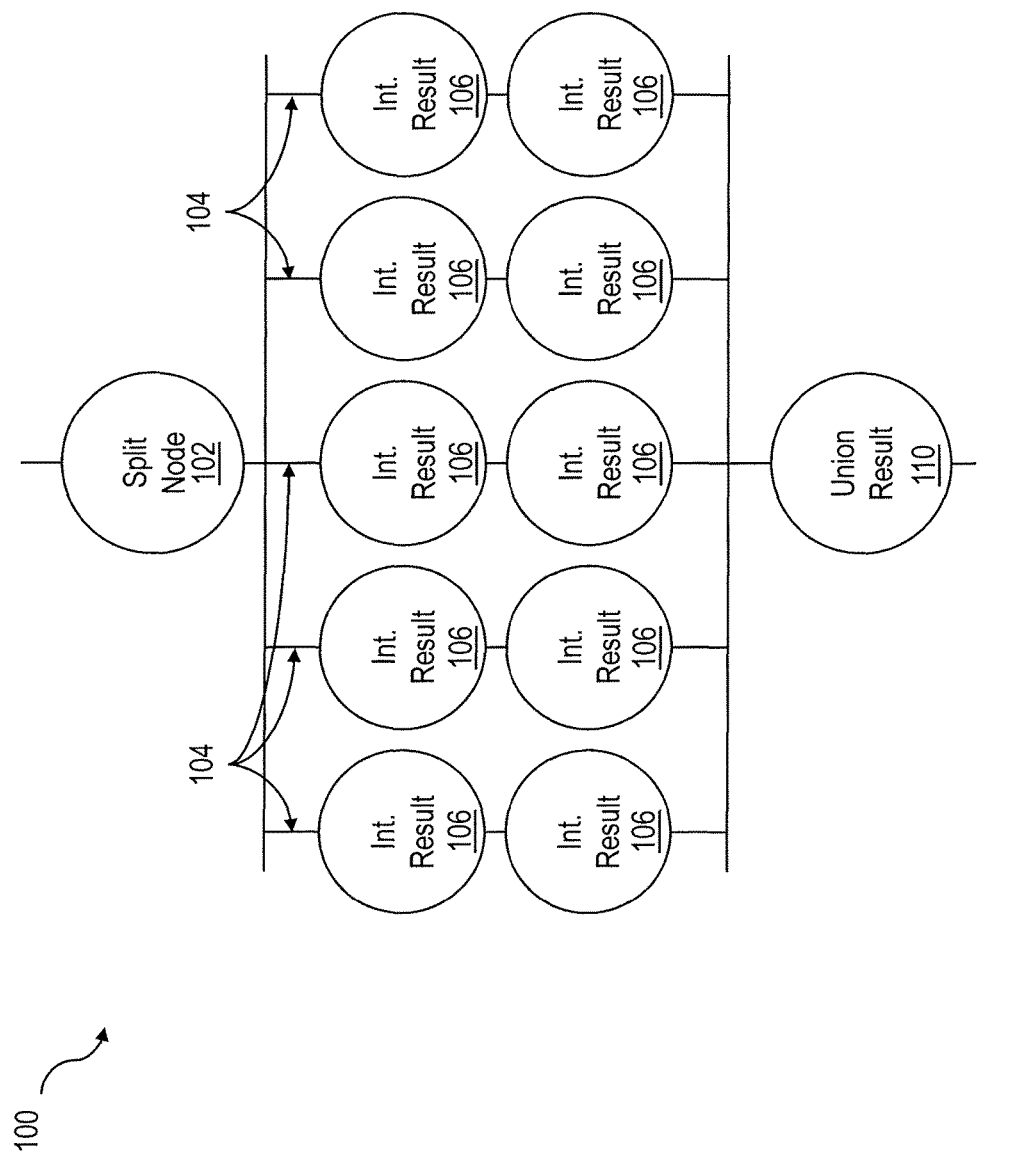
FIG. 1 is a state diagram illustrating an example of conflicting lock states in a partitioned database.

To enable parallel execution, a calculation model of a database management system in a multi-node data partitioning landscape that includes multiple processing nodes may contain operations such as splits, joins, and the like to be performed on the data managed by the database management system. A split operation can be used to partition input tables for subsequent processing steps based on partitioning criteria. Joins can connect partitioned tables. Operations between the splits, joins, and the like can also optionally be executed in parallel for the different partitions to the extent that the calculation model assigns them to available parallel processing paths.

A calculation model can be defined as part of the metadata of a database management system and invoked multiple times. In some implementations, SQL Script table functions can be used to define all or part of a calculation model. For example, when a CREATE FUNCTION statement is executed, the calculation model can be created and stored in metadata. When a SQL Script function is called at a later point in time, the calculation engine can read the definition of the calculation model and execute it.

Calculation models consistent with the current subject matter can be more powerful than traditional SQL queries, SQL views, or other similar approaches. For example, a calculation model as disclosed herein can enable the defining of parameterized calculation schemas that can be specialized when the actual query is issued. Unlike a SQL view, a calculation model need not describe the actual query to be executed. It can instead describe the structure of the calculation. Further information (optionally including, but not limited to, parameters that represent values, for example in filter conditions, table names, and the like) can be supplied when the calculation model is executed. To provide additional flexibility, it can be possible to refine the operations as well as how the operations are implemented on the available processing paths when the model is invoked. For example, at definition time (e.g. design time), the calculation model might contain an aggregation node without grouping criteria, and the attributes for grouping can be supplied with the query.

Implementations of the current subject matter can, among other possible features advantageously provide one or more split nodes that splits data according to a partition specification and also direct each of the newly split partitions to a different processing node for processing. After the processing, the data can be re-merged via the split node. As described in greater detail herein, grouping of database operation threads can be determined dynamically based on the actual structure of the data. A calculation engine can use actual parameters, attribute lists, grouping attributes, and the like supplied with the invocation of a query to instantiate a query specific calculation model and can also derive, from one or more columns of a table or tables upon which the database operations required by the query are performed, parallelization parameters used by the split node to divide and direct the required processing tasks among processor paths.

Consistent with implementations of the current subject matter, at instantiation of a query or other demand for a database execution plan, the calculation engine can generate the database execution plan, which describes data flows necessary to respond to the query or other request and also specifies the tasks, processes, operations, etc. to be executed on each of a plurality of processing nodes, which can be physical servers each including one or more programmable processors, server processes (e.g. virtual machines spread across one or more physical machines), a combination of physical and virtual processors, or the like. With parallelization among multiple parallel processing nodes, the calculation plan can introduce one or more split and merge operations that divide those operations amenable to being processed in parallel among the available processing paths. In other words, using parallel processing, two or more operations in a complex calculation plan that would have been performed serially if only a single node were available can instead be performed in parallel.

An example of part of a calculation plan 100 is illustrated in FIG. 1. As the plan progresses, a spilt node 102 can receive data, which can be an intermediate result of an earlier operation in the plan or data from one or more tables upon which the calculation plan is currently operating. The split node 102 can divide the received data into two or more threads for handling by two or more paths 104, each of which can generate one or more intermediate results 106 that are eventually unioned back into a union result 110, which can be used as an intermediate result by a next stage of the calculation plan if additional operations are required or returned as the final result.

The split node can perform a static split of the received data across a preset number of paths. Alternatively, and consistent with implementations of the current subject matter, the split can be performed dynamically based on a number of distinct (e.g. unique) values in a column of a table being operated upon. This feature can include the split node using a partition specification to split the received data among a number of paths based on the actual values in the column. Unlike a conventional calculation engine, which generally requires that split nodes be pre-modeled based on a known and set number of threads (e.g. a set number of partitions of the data to be provided to the processing paths for processing in parallel) to ensure that the data flow is done correctly, implementations of the current subject matter can integrate one or more dynamic split nodes into the calculation plan.

In this manner, a calculation model can generate a calculation plan at runtime that is tailored to a specific query and to the actual data involved in responding to the query.

The calculation plan can be statically generated as with conventional calculation model operations up to a dynamic split point in the calculation plan. At the dynamic split point, the calculation engine can apply a partition specification to one or more reference columns in a table, partition the table such that the records in the table are partitioned according to the partition specification, and set a separate processing path for each partition.

In one example, the partition specification can cause the dynamic split to examine at least one column in the received data (referred to herein as the "partitioning column," although this is merely an internal reference for use by the calculation engine), quantify the number of distinct values in the partitioning column, partition the table such that all records having each distinct value in the partitioning column are placed into respective partitions, and assign one execution path for handling the partition corresponding to each distinct value. For example, in a table having a partitioning column with containing four distinct values, the table can be split by the split node into four partitions. Each of four execution paths can be assigned one of the partitions.

Figure 2:
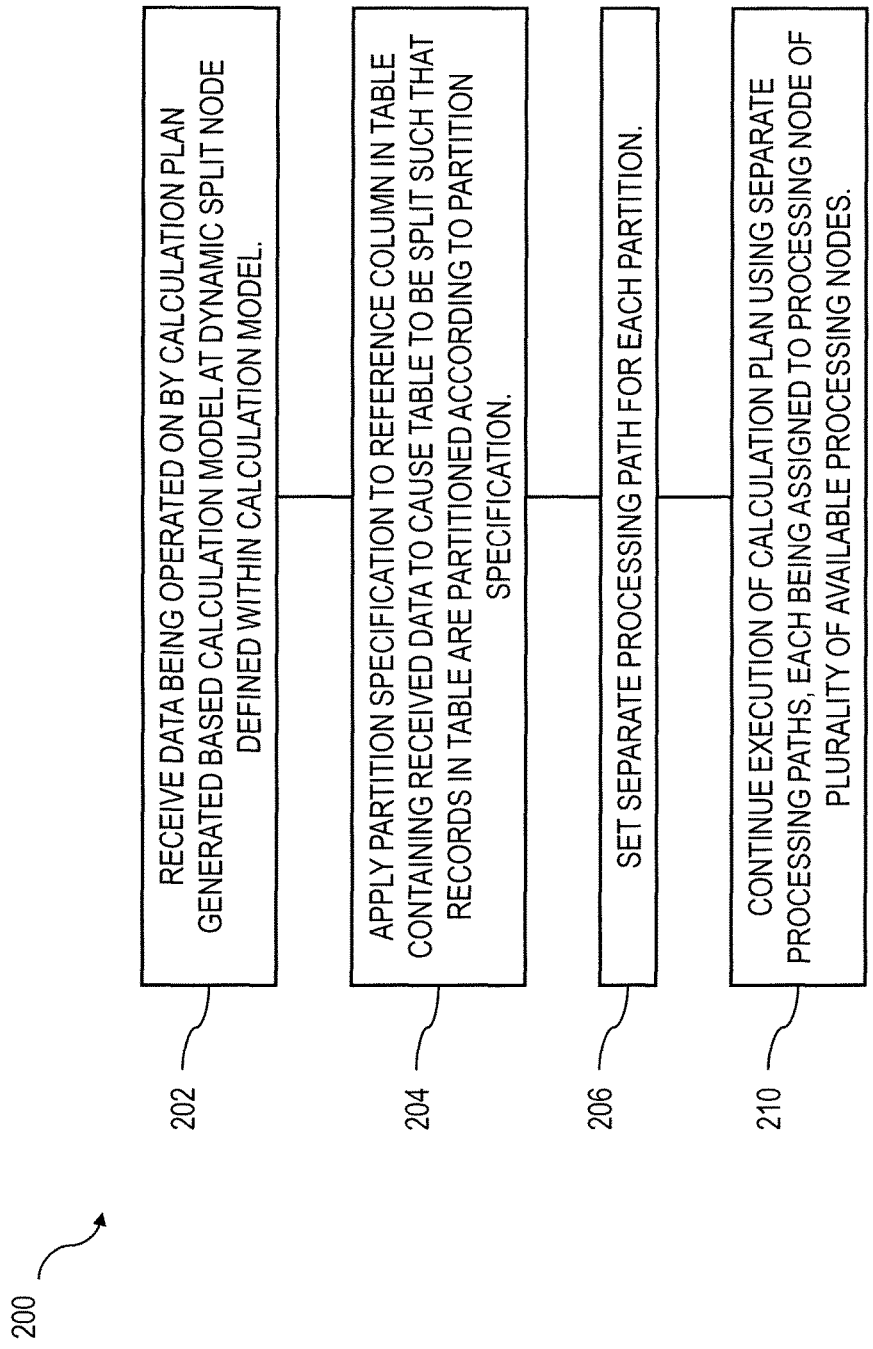
FIG. 2 is a process flow diagram illustrating aspects of a method having one or more features consistent with at least some implementations of the current subject matter.

FIG. 2 shows a process flow chart 200 illustrating method features, one or more of which can be included in implementations of the current subject matter. At 202, data being operated on by a calculation plan are received at a dynamic split node defined within a calculation model that defines how the calculation plan is generated. A partition specification is applied to one or more reference columns in a table containing at least some of the received data at 206, and the table is split such that the records in the table are partitioned according to the partition specification. A separate processing path for each partition is set at 206 and used in execution of the calculation plan at 210 such that each processing path is assigned to a processing node of a plurality of available processing nodes. After execution of a set of threads by the separate processing paths, the intermediate results from the set of threads can be unioned.

Figure 3:
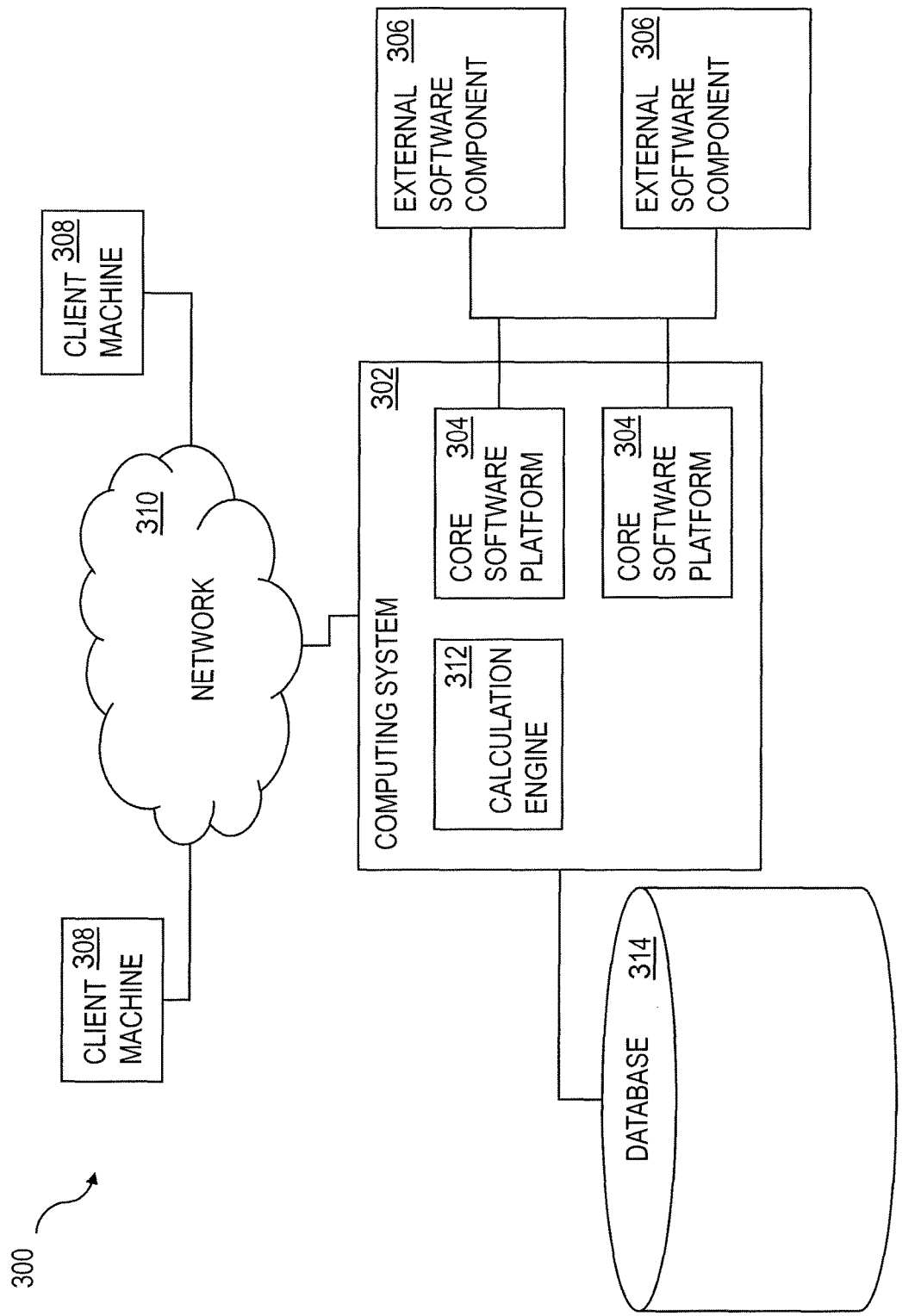
FIG. 3 is a diagram illustrating features of a business software system architecture consistent with at least some implementations of the current subject matter.

FIG. 3 shows a diagram of a system that can implement one or more features of the current subject matter. A computing system 302 can include one or more core software platform modules 304 providing one or more features of a business software system or other software that includes database management features. The computing system can also aggregate or otherwise provide a gateway via which users can access functionality provided by one or more external software components 306. One or more client machines 308 can access the computing system, either via a direct connection, a local terminal, or over a network 310 (e.g. a local area network, a wide area network, a wireless network, the Internet, or the like).

A calculation engine 312 or other comparable functionality can access a database 314 that includes at least one table 316, which can in turn include at least one column. The calculation engine 312 can implement one or more of the features of implementations discussed herein. The database table can store any kind of data, potentially including but not limited to definitions of business scenarios, business processes, and one or more business configurations as well as transactional data, metadata, master data, etc. relating to instances or definitions of the business scenarios, business processes, and one or more business configurations, and/or concrete instances of data objects and/or business objects that are relevant to a specific instance of a business scenario or a business process, and the like.

Figure 4:
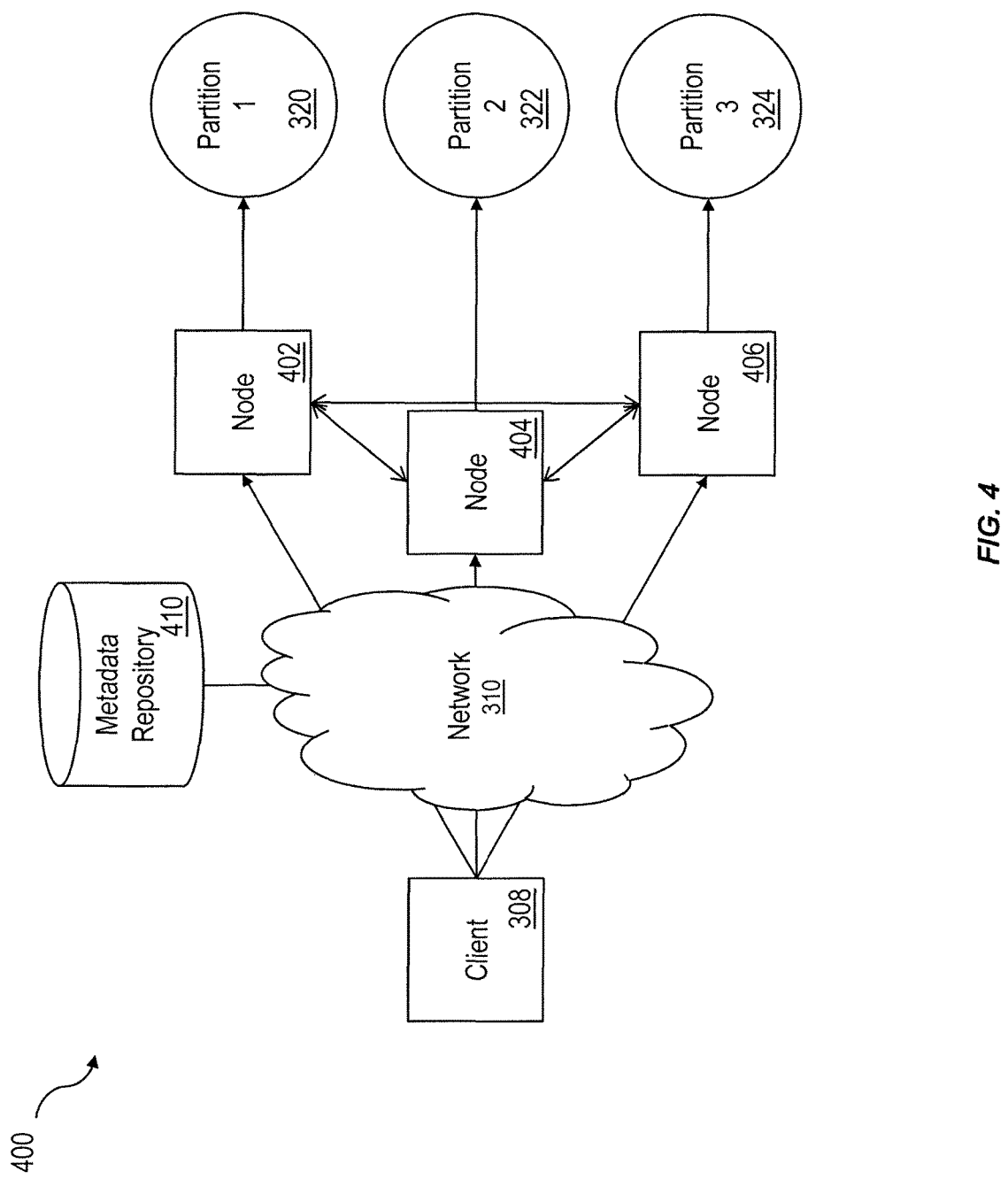
FIG. 4 is a diagram illustrating features of a independent index node partitioning approach consistent with at least some implementations of the current subject matter.

FIG. 4 shows an example of a multi-node data partitioning landscape 400 illustrating an approach to handling of data partitioned among multiple nodes in a multi-node system.

As shown in FIG. 4, a client 308 can communicate with a receiving node, which can be any of a plurality of parallel nodes 402, 404, 406 that each handles at least one of a plurality of data partitions 320, 322, 324. The communication between the client 308 and the receiving node of the plurality of parallel nodes 402, 404, 406 can be via a direct connection or over a network 310 as is shown in FIG. 4. Upon receiving data, a request for data or for data processing, or the like (hereinafter referred to generically as a request) from a client machine 308, a data provider, a data consumer, or the like, the receiving node of the multiple nodes parallel nodes 402, 404, 406 examines the request and determines how the request must be directed to the available nodes based on the data partitioning in the data partitions 320, 322, 324. The receiving node then distributes the request to the other parallel nodes 402, 404, 406 as necessary. The client 308 can communicate with any one of the parallel nodes 402, 404, 406 or with more than one or with all of the parallel nodes 402, 404, 406. A metadata repository 410 or other passive resource storing metadata or other mapping data, rules, attributes, the partitioning specification or criteria, etc. can be accessible to one or more of the client 308 and the plurality of parallel nodes 402, 404, 406. The metadata repository 410 can be accessible via the network 310, as shown in FIG. 4, or via one or more of the plurality of parallel nodes 402, 404, 406 or by the client 308 via a dedicated or shared connection.

In one variation, the client 308 can be provided with a partitioning specification or criteria in advance of the request, such as for example hash functions, ranges, or other information necessary to direct the request to an appropriate one or more of the nodes 306. In such a case, the receiving node of the parallel nodes 402, 404, 406 can also perform a check of the request to ensure that the request or part of the request received by the receiving node is directed properly. In some variations, round robin partitioning can be used. For example, hash values and ranges need not be part of the partitioning plan. Rather, distribution of data storage among the data partitions 320, 322, 324 of the multiple parallel nodes 402, 404, 406 can be controlled by the client 308 itself (optionally via contact with the metadata repository 410 or other resource), which can be tasked to send at least approximately the same volume of data to each of the multiple parallel nodes 402, 404, 406. In this example, the client 308 can perform load balancing functions to at least approximately equalize the amount of data stored on each of the multiple parallel nodes 402, 404, 406.

One potential use for various implementations of the current subject matter can include handling of the database demands of an enterprise resource planning (ERP) system, other business software architecture, or other data-intensive computing application or software architecture. Such applications can, in some examples, be provided as a standalone, customized software installation that runs on one or more processors that are under the control of a specific organization. This arrangement can be very effective for a large-scale organization that has very sophisticated in-house information technology (IT) staff and for whom a sizable capital investment in computing hardware and consulting services required to customize a commercially available business software solution to work with organization-specific business processes and functions is feasible. The diagram of FIG. 1 depicts an example of such a system.

Figure 5:
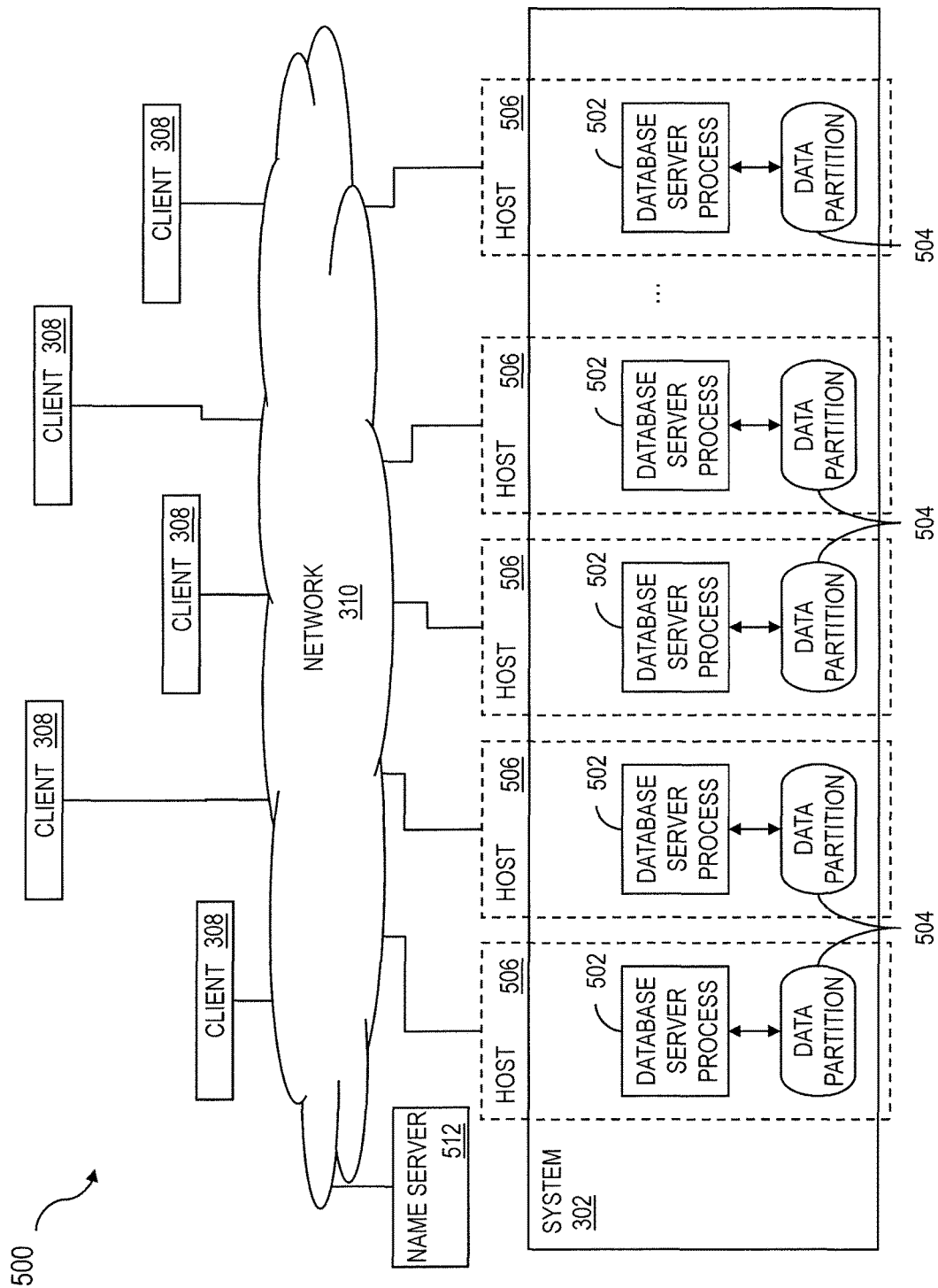
FIG. 5 is a diagram illustrating features of a database management system architecture consistent with at least some implementations of the current subject matter.

Alternatively or in addition, tables or ranges within tables can be assigned to different database partitions that are assigned to different hosts, for example data distribution and/or scalability reasons. FIG. 5 shows an example of an enterprise resource system architecture 500 consistent with an implementation that includes data distribution for scalability reasons. Such a configuration can be used for large, on-premise or stand-alone systems with high performance requirements. Each data server process 502 and its associated data partition 504 can be assigned to a discrete host 506. A host 506 can be a standalone machine with one or more physical processors or a virtual machine on a larger system 302 as depicted in FIG. 5. A central component, labeled as a name server 512 in FIG. 5, knows the topology of the system and how data is distributed. In a system with data distribution, the name server knows which tables or partitions of tables are located on which data server process 502. One or more clients 514 (e.g. client machines 308) can access the name server 512, either via a direct connection or over a network 516.

In a data distribution scenario, the partitioning can be done table wise or also by splitting tables. With table wise partitioning, the name server assigns new tables to a database server process 502 based on the current distribution of tables (number of tables assigned to each database server process 502). Then data for this table will reside only on that database server process 502. It is also possible to specify that a table is split over multiple database server processes 502. The name server 512 can optionally partition the table based on a size estimation specified by the application. When records are inserted into a split table, the records can be distributed to other database server processes 502 based on name server information.

Smaller organizations can also benefit from use of business software functionality. However, such an organization may lack the necessary hardware resources, IT support, and/or consulting budget necessary to make use of a stand-alone business software software architecture product and can in some cases be more effectively served by a software as a service (SaaS) arrangement in which the business software system architecture is hosted on computing hardware such as servers and data repositories that are maintained remotely from the organization's location and accessed by authorized users at the organization via a thin client, such as for example a web browser, over a network.

In a software delivery configuration in which services of an business software system are provided to each of multiple organizations are hosted on a dedicated system that is accessible only to that organization, the software installation at the dedicated system can be customized and configured in a manner similar to the above-described example of a standalone, customized software installation running locally on the organization's hardware. However, to make more efficient use of computing resources of the SaaS provider and to provide important performance redundancies and better reliability, it can be advantageous to host multiple tenants on a single system that includes multiple servers and that maintains data for all of the multiple tenants in a secure manner while also providing customized solutions that are tailored to each tenant's business processes.

Figure 6:
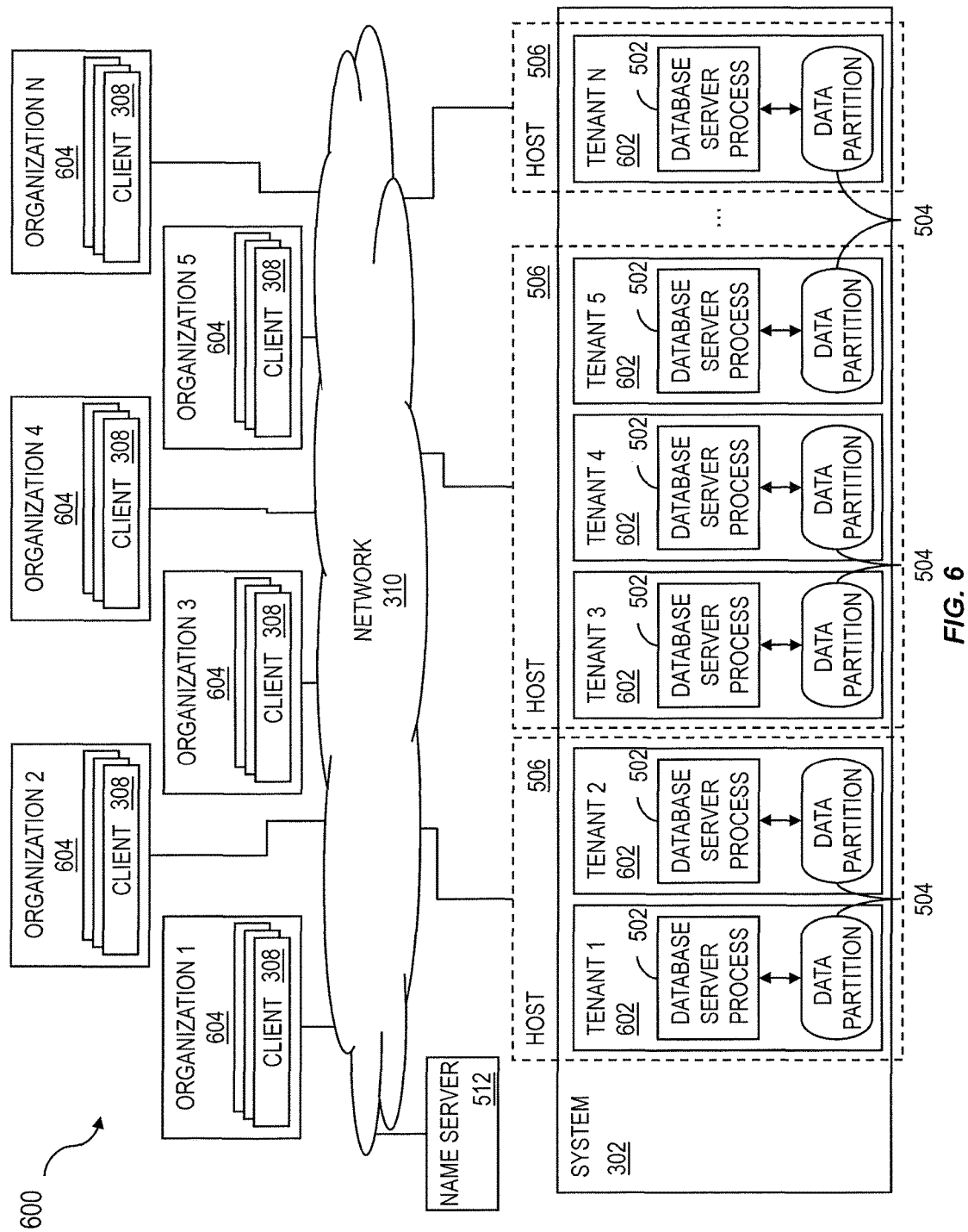
FIG. 6 is a diagram illustrating features of another database management system architecture consistent with at least some implementations of the current subject matter.

Data partitioning consistent with implementations of the current subject matter can also be used in a multi-tenancy environment as illustrated in the system architecture 600 of FIG. 6. Multiple tenants 602, each isolated from one another and available to be accessed by clients 514 within a separate organization 604 of a plurality of organizations via a network 516, can be hosted by a same host 506, which can be a virtual machine on a larger system 302 as shown in FIG. 6 or a separate system that includes one or more physical processors. Tenants 602 can also optionally be distributed across multiple database server processes 502 on more than one host 506. In this manner, tables or ranges within tables are assigned to different database server processes 502 that are assigned to different hosts 506 for scalability reasons. One or more tenants 602 can alternatively be served by a single database server process 502 accessing a data partition 504 (or multiple data partitions 504) for the respective tenant 602 that is isolated from other tenants 602.

To provide for customization of the business process for each of multiple organizations supported by a single software delivery architecture, the data and data objects stored by a database management system can include three types of content: core software platform content (e.g. a standard definition of a business process), system content, and tenant content. Core software platform content includes content that represents core functionality and is not modifiable by a tenant. System content can in some examples be created by the runtime of the core software platform and can include core data objects that store concrete data associated with specific instances of a given business process and that are modifiable with data provided by each tenant. The data retained in these data objects are tenant-specific: for example, each tenant of the group of tenants can store information about its own inventory, sales order, etc. Tenant content for isolated to each tenant of the group of tenants includes data objects or extensions to other data objects that are customized for one specific tenant of the group of tenants to reflect business processes and data that are specific to that specific tenant and are accessible only to authorized users at the corresponding tenant. Such data objects can include a key field (for example "client" in the case of inventory tracking) as well as one or more of master data, business configuration information, transaction data or the like. For example, tenant content can reflect tenant-specific modifications or changes to a standard template definition of a business process as well as tenant-specific customizations of the business objects that relate to individual process step (e.g. records in generated condition tables, access sequences, price calculation results, other tenant-specific values, or the like). A combination of the software platform content and system content and tenant content of a specific tenant of the group of tenants are accessed to provide the business process definition and/or the status information relating to a specific instance of the business process according to customizations and business data of that tenant such that each tenant of the group of tenants is provided access to a customized solution whose data are available only to users from that tenant.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer program product comprising a non-transitory machine-readable storage medium storing instructions that, when executed by at least one programmable processor, cause the at least one programmable processor to perform operations comprising:

receiving, at a first node defined within a calculation model, first data, the calculation model including a master node and a plurality of processing nodes comprising the first node, the plurality of processing nodes being controlled by the master node, the first data comprising at least one of a first intermediate result of an earlier operation in a calculation plan generated from the calculation model or second data from a table upon which the calculation plan is currently operating in response to a query, the calculation plan generated at runtime and tailored to both the query and a response to the query;

applying, at the first node and in response to receiving the first data, a partition specification to a column in the first data, the applying comprising:

determining, at the first node and in response to receiving the first data, a number of unique values in a column in the first data;

splitting, at the first node and according to the partition specification, a first table into a number of partitions equal to the number of unique values in the column, wherein each unique value has a corresponding partition; and placing records of the first table having the same unique value together in a partition;

assigning, at the first node, a separate processing path for each of the number of partitions, each separate processing path being assigned for generation, by a respective processing node of the plurality of processing nodes, of one or more intermediate results based on a respective partition of the number of partitions;

executing, at a second node of the plurality of processing nodes, a union operation to union the generated one or more intermediate results, wherein the unioned one or more intermediate results comprise a union result;

using the union result as a subsequent intermediate result by additional execution operations of the calculation plan if additional operations are required by the calculation plan; and returning the union result as a final result for the query if no additional execution operations are required by the calculation plan.

2. A computer program product as in claim 1, wherein the operations further comprise:

initiating the query;

receiving, by a recipient node of the plurality of processing nodes, a data request in response to the initiated query, wherein the data request is received directly from a requesting machine without being handled by the master node;

identifying, by the recipient node, a target node of the plurality of processing nodes to handle the data request, the identifying comprising: applying partitioning information to determine one partition of the number of partitions to which the data request should be directed and mapping information associating each of the number of partitions with an assigned node of the plurality of processing nodes; and redirecting, by the recipient node, the data request to the target node, wherein the target node acts on the one partition in response to the data request to obtain at least a portion of the received data specified by the calculation plan.

3. A computer program product as in claim 2, wherein the operations further comprise:

accessing the partitioning information and the mapping information from at least one of a local storage accessible to the recipient node and a metadata repository accessible to each of the plurality of processing nodes.

4. A system comprising:

at least one programmable processor; and a machine-readable medium storing instructions that, when executed by the at least one processor, cause the at least one programmable processor to perform operations comprising:

receiving, at a first node defined within a calculation model, first data, the calculation model including a master node and a plurality of processing nodes comprising the first node, the plurality of processing nodes being controlled by the master node, the first data comprising at least one of a first intermediate result of an earlier operation in a calculation plan generated from the calculation model or second data from a table upon which the calculation plan is currently operating in response to a query, the calculation plan generated at runtime and tailored to both the query and a response to the query;

applying, at the first node and in response to receiving the first data, a partition specification to a column in the first data, the applying comprising:

determining, at the first node and in response to receiving the first data, a number of unique values in a column in the first data;

splitting, at the first node and according to the partition specification, a first table into a number of partitions equal to the number of unique values in the column, wherein each unique value has a corresponding partition; and placing records of the first table having the same unique value together in a partition;

assigning, at the first node, a separate processing path for each of the number of partitions, each separate processing path being assigned for generation, by a respective processing node of the plurality of processing nodes, of one or more intermediate results based on a respective partition of the number of partitions;

executing, at a second node of the plurality of processing nodes, a union operation to union the generated one or more intermediate results, wherein the unioned one or more intermediate results comprise a union result;

using the union result as a subsequent intermediate result by additional execution operations of the calculation plan if additional operations are required by the calculation plan; and returning the union result as a final result for the query if no additional execution operations are required by the calculation plan.

5. A system as in claim 4, wherein the operations further comprise:

initiating the query;

receiving, by a recipient node of the plurality of processing nodes, a data request in response to the initiated query, wherein the data request is received directly from a requesting machine without being handled by the master node;

identifying, by the recipient node, a target node of the plurality of processing nodes to handle the data request, the identifying comprising: applying partitioning information to determine one partition of the number of partitions to which the data request should be directed and mapping information associating each of the number of partitions with an assigned node of the plurality of processing nodes; and redirecting, by the recipient node, the data request to the target node, wherein the target node acts on the one partition in response to the data request to obtain at least a portion of the received data specified by the calculation plan.

6. A system as in claim 5, wherein the operations further comprise:

accessing the partitioning information and the mapping information from at least one of a local storage accessible to the recipient node and a metadata repository accessible to each of the plurality of processing nodes.

7. A method comprising:

receiving, at a first node defined within a calculation model, first data, the calculation model including a master node and a plurality of processing nodes comprising the first node, the plurality of processing nodes being controlled by the master node, the first data comprising at least one of a first intermediate result of an earlier operation in a calculation plan generated from the calculation model or second data from a table upon which the calculation plan is currently operating in response to a query, the calculation plan generated at runtime and tailored to both the query and a response to the query;

applying, at the first node and in response to receiving the first data, a partition specification to a column in the first data, the applying comprising:

determining, at the first node and in response to receiving the first data, a number of unique values in a column in the first data;

splitting, at the first node and according to the partition specification, a first table into a number of partitions equal to the number of unique values in the column, wherein each unique value has a corresponding partition;

placing records of the first table having the same unique value together in a partition;

assigning, at the first node, a separate processing path for each of the number of partitions, each separate processing path being assigned for generation, by a respective processing node of the plurality of processing nodes, of one or more intermediate results based on a respective partition of the number of partitions; and executing, at a second node of the plurality of processing nodes, a union operation to union the generated one or more intermediate results, wherein the unioned one or more intermediate results comprise a union result;

using the union result as a subsequent intermediate result by additional execution operations of the calculation plan if additional operations are required by the calculation plan; and returning the union result as a final result for the query if no additional execution operations are required by the calculation plan.

8. A method as in claim 7, further comprising:

initiating the query;

receiving, by a recipient node of the plurality of processing nodes, a data request in response to the initiated query, wherein the data request is received directly from a requesting machine without being handled by the master node;

identifying, by the recipient node, a target node of the plurality of processing nodes to handle the data request, the identifying comprising: applying partitioning information to determine one partition of the number of partitions to which the data request should be directed and mapping information associating each of the number of partitions with an assigned node of the plurality of processing nodes; and redirecting, by the recipient node, the data request to the target node wherein the target node acts on the one partition in response to the data request to obtain at least a portion of the received data specified by the calculation plan.

9. A method as in claim 8, further comprising:

accessing the partitioning information and the mapping information from at least one of a local storage accessible to the recipient node and a metadata repository accessible to each of the plurality of processing nodes.

* * * * *